J. W. GARRETT.
COTTON CHOPPER.
APPLICATION FILED DEC. 26, 1908.
913,373.
Patented Feb. 23, 1909.
3 SHEETS—SHEET 1.
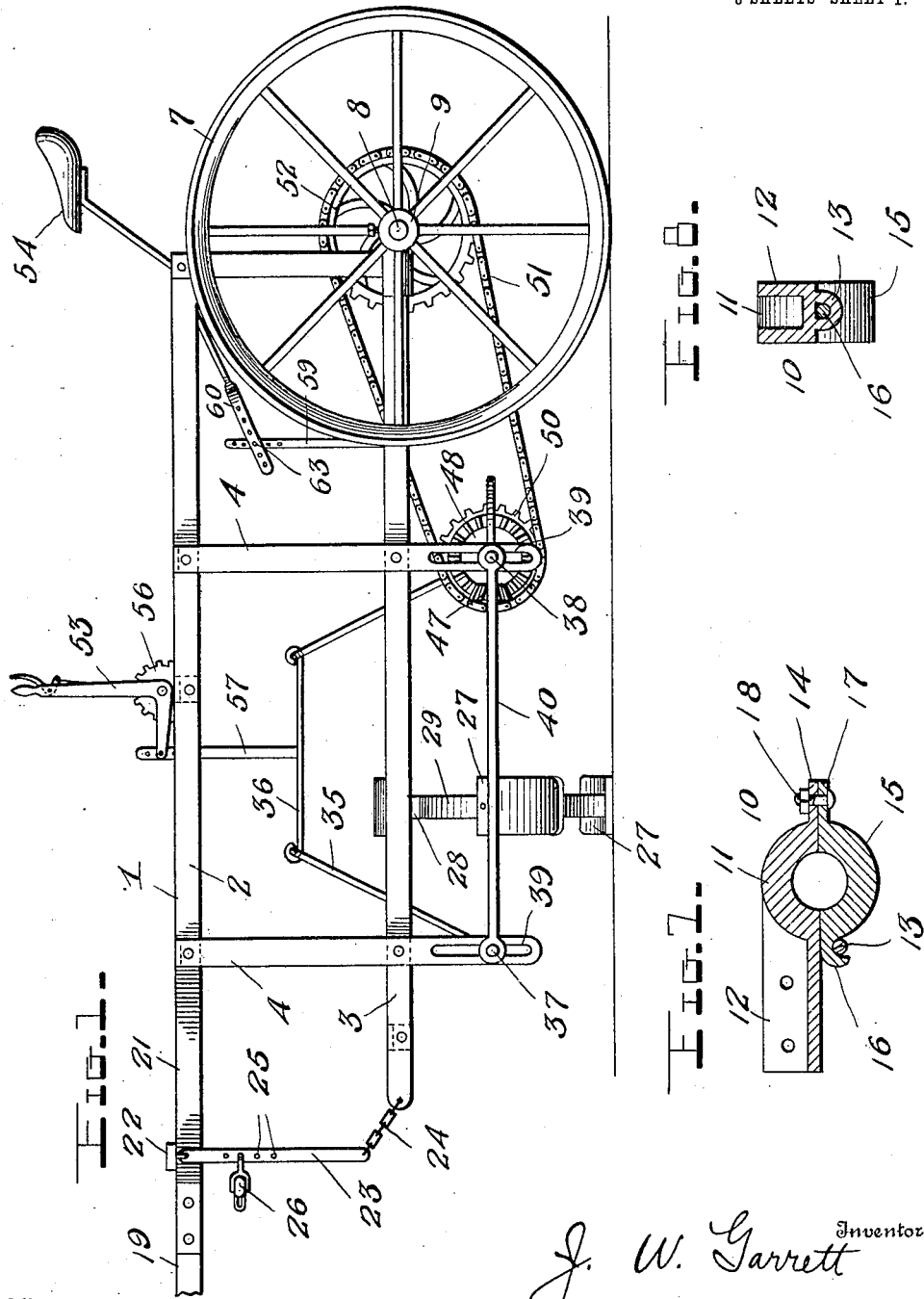
Witnesses
Chas. L. Griesbauer.
Madelon E. Burns.
Inventor
J. W. Garrett
By Watson E. Coleman
Attorney

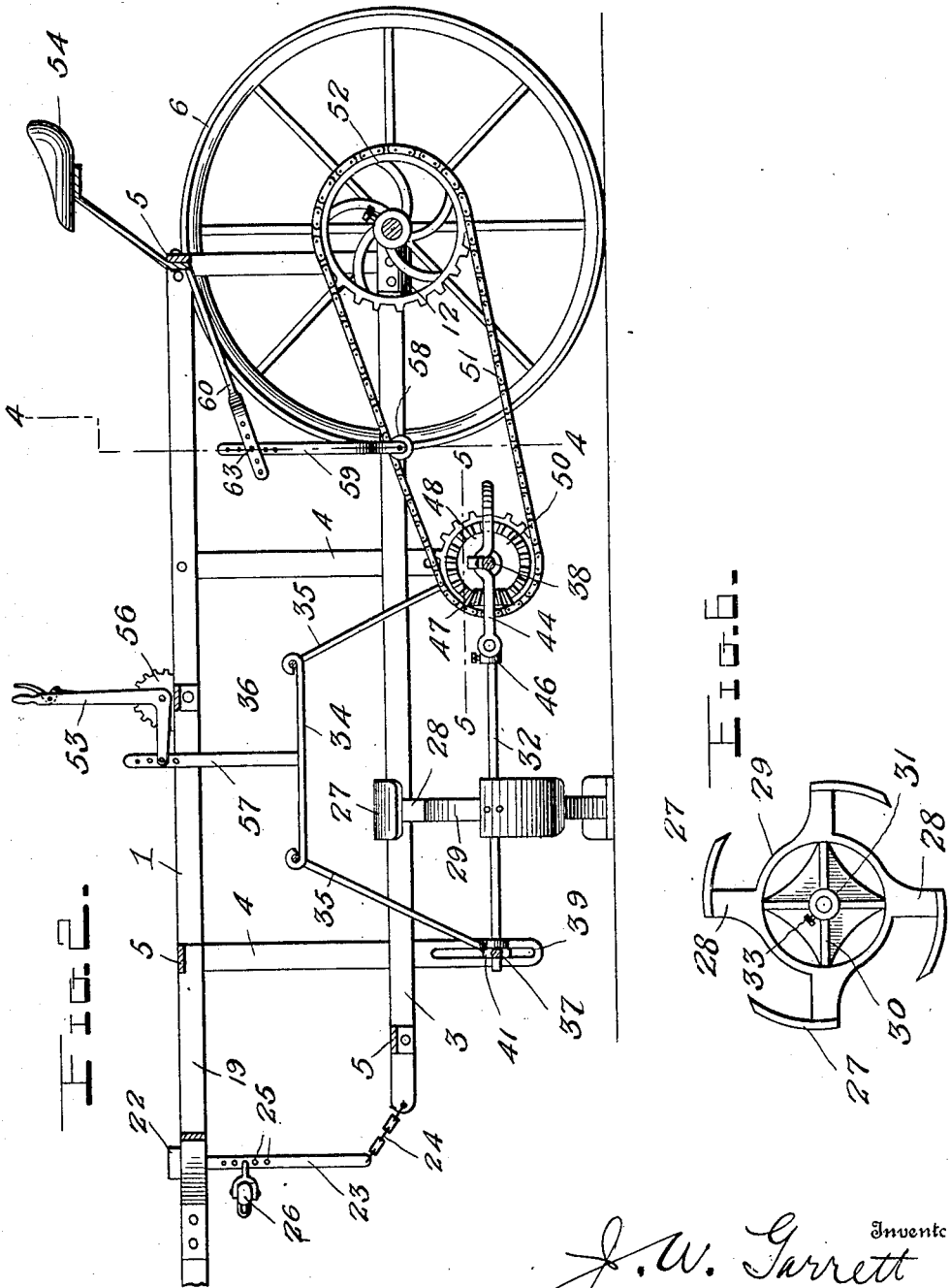

J. W. GARRETT.
COTTON CHOPPER.
APPLICATION FILED DEC. 26, 1908.
913,373.
Patented Feb. 23, 1909.
3 SHEETS—SHEET 3.
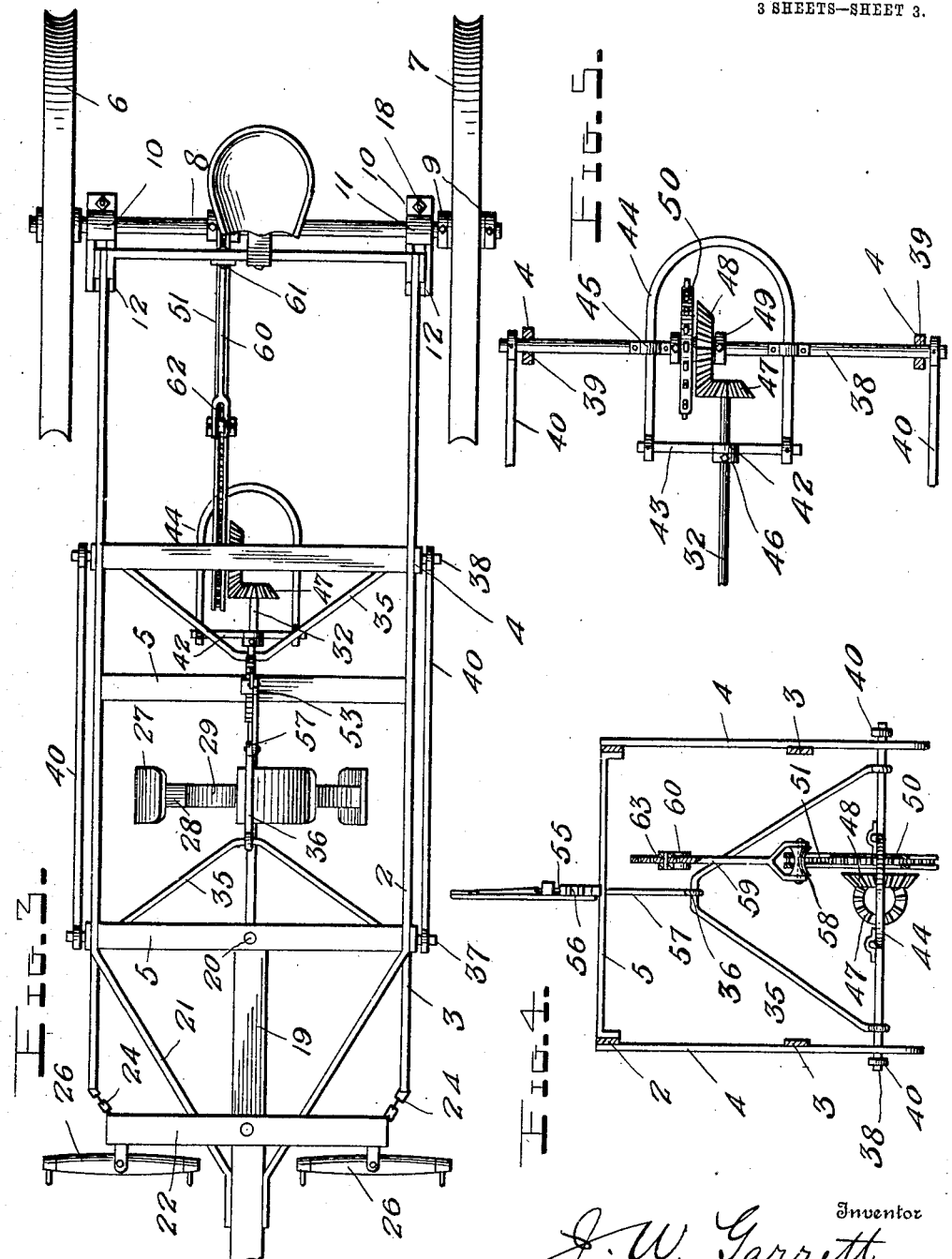
Witnesses
Chas. L. Griesbauer.
Madelon C. Burns.
Inventor
J. W. Garrett
By Watson E. Coleman
Attorney

UNITED STATES PATENT OFFICE.

JAMES WILLIAM GARRETT, OF ELK CITY, OKLAHOMA.

COTTON-CHOPPER.

No. 913,373.

Specification of Letters Patent.

Patented Feb. 23, 1909.

Application filed December 26, 1908. Serial No. 469,349.

*To all whom it may concern:*

Be it known that I, JAMES W. GARRETT, a citizen of the United States, residing at Elk City, in the county of Beckham and State of Oklahoma, have invented certain new and useful Improvements in Cotton-Choppers, of which the following is a specification, reference being had to the accompanying drawings.

This invention relates to improvements in cotton choppers and consists of the novel features of construction and the combination of parts hereinafter fully described and claimed.

The object of the invention is to provide a simple and practical machine of this character in which the shaft carrying the rotary chopping hoes may be readily adjusted.

The above and other objects of the invention are attained in the construction illustrated in the accompanying drawings, in which—

Figure 1 is a side elevation of the improved cotton chopping machine; Fig. 2 is a vertical longitudinal section; Fig. 3 is a top plan view; Fig. 4 is a detail cross section taken on the plane indicated by the line 4—4 in Fig. 2; Fig. 5 is a detail horizontal section taken on the plane indicated by the line 5—5 in Fig. 2; Fig. 6 is a side elevation of the wheel carrying the chopping hoes; and Figs. 7 and 8 are detail views of the bearing for the axle of the supporting wheels.

In the drawings 1 denotes a main frame consisting of upper and lower pairs of longitudinal side bars 2, 3 united by upright side bars 4, the longitudinal side bars of each pair being united by horizontal cross bars 5. The rear end of the frame is supported by two ground wheels 6, 7, the former of which is fixed to one end of an axle 8 so as to cause the latter to rotate with it and the other of which is loose upon the opposite end of the shaft 8 and retained thereon by adjustable collars 9. The shaft 8 is journaled in two bearings 10 arranged upon the lower rear corners of the frame and each consisting of an upper bearing member 11 formed with an attaching shank 12 and with a semicircular bearing recess on one side of which is a loop 13 and on the other side of which is an apertured lug 14. Said bearing also consists of a lower bearing member 15 having a curved bearing recess on one side of which is a hook 16 to engage the loop 13 and on the other side of which is an apertured lug 17 adapted to engage the lug 14 so that the fastening bolt 18 may be passed through the apertures in the two lugs. The front end of the frame is adapted to be supported by the draft animals attached to a draft tongue or pole 19 secured at its rear end to the center of the upper cross bar 5, as shown at 20, and between the converging forward ends 21 of the two upper longitudinal side bars 2, which ends 21 form diagonal braces, as seen in Fig. 3. Upon the top of the tongue 19 is pivoted a double tree 22 from which loosely depend links 23 which have their lower ends connected by chains or the like 24 to the projecting forward end of the two lower longitudinal side bars 3. The double tree 22 may, if desired, be located beneath the tongue. The links 23 are formed with vertical series of apertures 25 to receive hooks or other fastenings on swingle trees 26 so that the latter may be adjusted vertically on the links 23.

The chopping of the cotton plants is done by means of a series of circumferentially extending hoe blades 27 secured on the ends of arms 28 projecting radially from the rim 29 of a wheel 30, which latter has a hub 31 slidably arranged upon a shaft 32 and adapted to be secured in an adjusted position thereon by a set screw 33, as seen in Fig. 6. The shaft 32 is arranged centrally and longitudinally beneath the main frame 1 and is rotatable in bearings carried by a vertically adjustable hoe supporting frame 34. The latter consists of two inverted V-shaped or U-shaped members 35, the closed upper and converging ends of which are united to the ends of a longitudinal bar 36 and the diverging arms of the diverging lower ends of said members 35 are united to two transverse bars 37, 38, the ends of which slide in vertical slots 39 formed in the depending lower ends of the upright bars 4. Said projecting ends of the cross bars 37, 38 are united by longitudinal slide bars 40 which serve to strengthen the hoe supporting and adjusting frame 34. Said hoe carrying shaft 23 has its forward end journaled in a centrally arranged bearing 41 on the bar 37 and its rear end is journaled in a bearing 42 and a short cross bar 43 connecting the ends or arms of a U-shaped member 44 which is fastened by clips 45 or other suitable means to the cross bar 38, as shown more clearly in Fig. 5. Adjustably fixed collars 46 arranged on the shaft 32 prevent longitudinal movement of the latter.

The rear end of the shaft 32 has fixed upon it a beveled pinion 47 which is in mesh with a beveled gear 48 loosely arranged upon the cross bar or shaft 38 and prevented from shifting longitudinally thereon by means of adjustable collars 49. Formed integral with or suitably connected to the gear 48 is a sprocket wheel 50 which is connected by a chain 51 to a sprocket wheel 52 fixed to the axle 8.

The hoe carrying frame 34 is adapted to be raised or lowered vertically and retained in an adjusted position by means of a hand lever 53 in the form of a bell crank pivoted at its angle upon one of the cross bars 5 of the main frame 1 and within convenient reach of the driver who sits upon a seat 54. The long arm of the bell crank 53 carries a hand retracted pawl 55 to engage a segmental locking rack 56 and the short arm of said bell crank is adjustably connected to an upright 57 rising from the center of the bar 36 and having its upper end formed with a longitudinal series of openings by means of which the adjustment between the arm of the bell crank or lever and the frame 34 may be effected. It will be seen that when the pawl 55 is retracted and the lever 53 shifted the hoes 27 may be raised or lowered with respect to the ground to cause the machine to operate efficiently.

In order to maintain the sprocket chain 51 taut at all times, an idler wheel or pulley 58 is engaged with the under face of the upper stretch of the chain and journaled in the forked lower end of a link 59, the upper end of which is adjustably connected to a resilient supporting bracket or spring 60. The latter is in the form of a strap of resilient metal having one end bent angularly and secured to the upper rear cross bar 5, as shown at 61, and its other end which inclines downwardly and forwardly is formed with a vertically disposed and longitudinally extending slot 62 to receive the upper end of the link 59. Said end of the latter and the slotted portion of the spring or resilient bracket 50 are formed with longitudinal series of apertures adapted to be brought into alinement with each other and to receive a retaining pin 63 by means of which the link 59 may be adjusted both vertically and horizontally or longitudinally.

Having thus described the invention what is claimed is:

1. In a cotton chopper, a main frame having a pair of opposing upright side bars formed with vertical slots, supporting and drive wheels, a rotatable shaft or axle for the latter, a vertically adjustable hoe carrying frame having transverse bars with ends projecting through and vertically slidable in the slots in the uprights of the main frame, longitudinal bars uniting the ends of the cross bars, a longitudinally arranged shaft journaled in bearings upon the hoe carrying frame, hoes carried by said longitudinal shaft, a rotary element for driving the longitudinal shaft, a sprocket wheel upon said element, a second sprocket wheel upon the axle, a chain engaged with said sprocket wheels, and means for automatically taking up the slack in the chain when the hoe carrying frame is adjusted.

2. In a cotton chopper, a main frame having a pair of opposing upright side bars formed with vertical slots, supporting and drive wheels, a rotatable shaft or axle for the latter, a vertically adjustable hoe carrying frame having transverse bars with ends projecting through and vertically slidable in the slots in the uprights of the main frame, longitudinal bars uniting the ends of the cross bars, a U-shaped member upon the rear cross bar, a longitudinal shaft journaled in bearings upon the front cross bar and said U-shaped member, hoes carried by the longitudinal shaft, a beveled gear fixed to the longitudinal shaft, a meshing beveled gear loosely mounted on the rear cross bar, a sprocket wheel rotatable with said loose beveled gear, a second sprocket wheel fixed to the axle, a sprocket chain engaged with the sprocket wheels, a resilient bracket upon the main frame, a link connected to said bracket and an idler wheel journaled upon the link and engaged with one of the stretches of the chain.

3. In a cotton chopper, a main frame, an axle, supporting and drive wheels upon the axle, vertical guides thereon, a hoe carrying frame slidable in said guides, means for adjusting said hoe carrying frame, a longitudinal shaft journaled upon the hoe carrying frame, hoes upon said shaft, a rotary element for operating the longitudinal shaft, a sprocket wheel connected to said element, a sprocket wheel upon the axle, a chain connecting the sprocket wheels, a resilient bracket on the main frame, a link connected to the bracket and an idler wheel journaled upon the link and engaged with one of the stretches of the chain.

In testimony whereof I hereunto affix my signature in the presence of two witnesses.

JAMES WILLIAM GARRETT.

Witnesses:
JNO. W. FLOURNOY,
J. J. QUEENAN.